US007664071B2

(12) United States Patent
Yuda

(10) Patent No.: US 7,664,071 B2
(45) Date of Patent: *Feb. 16, 2010

(54) BASE STATION SYSTEM AND METHOD FOR ASSIGNING A UNIQUE WORD IN A COMMUNICATION SYSTEM

(75) Inventor: Tetsuya Yuda, Mountain View, CA (US)

(73) Assignee: Kyocera Corporation, Kyoto (JP)

( * ) Notice: Subject to any disclaimer, the term of this patent is extended or adjusted under 35 U.S.C. 154(b) by 519 days.

This patent is subject to a terminal disclaimer.

(21) Appl. No.: 11/287,814

(22) Filed: Nov. 28, 2005

(65) Prior Publication Data

US 2007/0121544 A1 May 31, 2007

(51) Int. Cl.
*H04W 4/00* (2006.01)
(52) U.S. Cl. ............ 370/329; 370/318; 370/319; 370/320; 370/321; 370/322; 370/341; 455/432.1; 455/435.1; 455/434; 455/435.2; 455/464
(58) Field of Classification Search ......... 370/318–322, 370/329, 341; 455/432.1, 435.1, 434, 435.2, 455/464
See application file for complete search history.

(56) References Cited

U.S. PATENT DOCUMENTS

| 5,027,356 | A | | 6/1991 | Nakamura et al. | |
|---|---|---|---|---|---|
| 5,590,339 | A | * | 12/1996 | Chang | 713/310 |
| 5,884,145 | A | * | 3/1999 | Haartsen | 455/63.2 |
| 5,901,357 | A | * | 5/1999 | D'Avello et al. | 455/454 |
| 6,539,203 | B1 | * | 3/2003 | Herrig | 455/62 |
| 7,085,572 | B2 | * | 8/2006 | Ishida | 455/450 |
| 7,257,376 | B2 | * | 8/2007 | Reudink | 455/63.1 |
| 2002/0039886 | A1 | * | 4/2002 | Doi | 455/25 |
| 2006/0072535 | A1 | * | 4/2006 | Ito | 370/348 |

FOREIGN PATENT DOCUMENTS

| EP | 1 443 680 | 8/2004 |
|---|---|---|
| JP | 2004-112590 | 4/2004 |
| JP | 2002-274640 | 8/2004 |
| WO | WO 2004/028194 | 4/2004 |

OTHER PUBLICATIONS

Abstract (English)—JP 2004 112590A, Publication Date-Aug. 4, 2004, "Radio Base Station, Reference Signal Assignment Method and Reference Signal Assignment Program", Sanyo Electric Co LTD, http//www.aurekaontap.com, 1 page, Nov. 14, 2005.
PHS MoU Group, "General Description of Public Personal Handy-Phone System", PHS MoU Document-A-GN0.00-01-TS, Version 01, pp. 1-13, Apr. 21, 1997.

* cited by examiner

*Primary Examiner*—Stephen M D'Agosta

(57) ABSTRACT

A method and system for assigning unique words in an SDMA communication system is disclosed. A base station has a set of available unique words from which to select and assign unique words. The base station prioritizes the unique words by determining which unique words are likely to interfere with adjacent base stations, and setting those words to a low priority. Thus, over time, the base station assigns unique words that have better cross correlation characteristics and improved communication sensitivity. The base station discovers the unique words likely to be used in adjacent base stations by direct communication with adjacent base stations, or by communicating with a central office facility. Alternatively, the base station may be made aware of the unique IDs for adjacent base stations, and use these IDs to determine a set of unique words likely to be used by these adjacent base stations.

23 Claims, 6 Drawing Sheets

BASE STATION SYSTEM AND METHOD FOR ASSIGNING A UNIQUE WORD IN A COMMUNICATION SYSTEM

FIELD OF THE INVENTION

The present invention relates generally to wireless communication systems, and more specifically to assigning unique words in an SDMA (spatial division multiple access) communication system using a base station.

BACKGROUND OF THE INVENTION

The deployment and use of wireless communication systems is dramatically increasing, with associated pressures to increase system capacity, bandwidth, and quality. One way to increase system capacity is by employing a multiple access process, which allows a scare system resource to be shared between multiple users. For example, some communication systems operate according to a TDMA (time division multiple access) process. In a TDMA communication system, a predetermined time frame is sub-divided into slots, and each user is assigned a slot for receiving and transmitting data or voice signals. In this way, multiple users are able to share the same time frame.

In another example, some communication systems operate according to an SDMA (spatial division multiple access). In an SDMA system, a directable antenna array is configured to allow a particular frequency to be used by multiple users operating in the same general geographic area.

In use, each mobile user operates a device that is assigned a unique word prior to initiating data or voice communication with a base station. Thereafter, from time to time, the unique word is transmitted from the remote user, which assists the base station in determining the spatial signature of the remote device. In turn, this allows the base station to configure its directable antenna to better differentiate communication signals originating from different mobile devices, even though the devices are communicating on the same frequency. In this way, an SDMA communication system allows multiple uses to share the same frequency.

Some communication systems may use more than one multiple access process to further increase system capacity. For example, the PHS (personal handyphone system) communication system, which is widely deployed in Japan, combines the benefits of both TDMA and SDMA. That is, PHS divides a time frame into slots, and then assigns unique words with respect to each slot. In this way, each time frame allows for multiple users in the slots, and each slot allows for multiple access by using the same frequency. In PHS, the base station is generally referred to as the cell station, while the remote mobile device is referred to as the personal station.

The PHS system is a recognized international standard promulgated by ARIB (Association of Radio Industries and Businesses). More particularly, document RCR- STD-28 details the requirements and options available in a PHS communication system. For example, PHS, as with other SDMA communication systems, may be implemented with a limited number of available unique words. Although the unique words may be selected for low cross correlation effects, because there are a limited number available, unique words are reused throughout the PHS communication system. However, to enable the directable antenna to operate properly, it is important that the unique words for personal stations be different, and more importantly, to be different enough to support signal differentiation by the cell station. Accordingly, when a personal station makes a request to access the PHS cell station, the PHS cell station should consider which unique words are in use in an area around the requesting personal station.

Currently, there are two known techniques for attempting to avoid assigning the same unique word to two personal stations operating in the same general area. However, neither has proved satisfactory. First, the cell station may monitor the communication traffic channel ("TCH") being transmitted from neighboring cell stations to determine which unique words are currently in use in adjacent cells. However, monitoring the TCH channel requires signification system resources, and may degrade overall system capacity. Also, cells may not overlap sufficiently to allow a complete monitoring and accounting of all or nearly all of the unique words in use. Accordingly, monitoring TCH to assist in assigning unique words has not proved practical. Second, each cell station may attempt to randomize its assigning of unique words. However, even when each cell station randomly assigns words, it is possible to assign the same or similar unique words to personal stations operating in the same general geographic area. In this regard, two personal stations assigned such similar unique words will generate communication signals that are undesirably similar, and overall system capacity and quality will be reduced. Stated differently, it is desirable that the signals generated by such mobile stations have a low level of correlation to allow for better signal differentiation.

Therefore, there exists a need for a process and system for assigning unique words to achieve an improved system capacity, to lower interference, and to enable better signal differentiation.

SUMMARY OF THE INVENTION

Briefly, the present invention provides a method and system for assigning unique words in an SDMA (spatial division multiple access) communication system. A base station has a set of available unique words from which to select and assign unique words. The base station prioritizes the set of unique words by determining which unique words are likely to interfere with adjacent base stations, and setting those words to a low priority. In this way, over time, the base station assigns unique words that enable personal stations to generate signals that have lower cross correlation characteristics and improved communication sensitivity. The base station discovers the set of unique words likely to be used in adjacent base stations. These unique words may be discovered by direct network communication with each adjacent base station, or by communicating with a central office facility. Alternatively, the base station may be made aware of the unique IDs for adjacent base stations, and use these IDs to determine a set of unique words likely to be used by these adjacent base stations. The base station is therefore able to assign unique words that facilitate improved communications.

In a more specific example, a method and system is provided for assigning unique words in a PHS (personal handyphone system) communication system. A cell station has a set of available unique words from which to select and assign unique words. The cell station prioritizes the set of unique words by determining which unique words are likely to interfere with adjacent cell stations, and setting those words to a low priority. In this way, over time, the cell station assigns unique words that have a lower level of correlation to allow for better signal differentiation and improved communication sensitivity. The cell station discovers the set of unique words likely to be used in adjacent cell stations. These unique words may be discovered by direct network communication with each adjacent cell station, or by communicating with a central office facility. Alternatively, the cell station may be made aware of the unique IDs for adjacent cell stations, and use these IDs to determine a set of unique words likely to be used by these adjacent cell stations. The cell station is therefore able to assign unique words that facilitate improved communications.

These and other features of the present invention will become apparent from a reading of the following description, and may be realized by means of the instrumentalities and combinations particularly pointed out in the appended claims.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
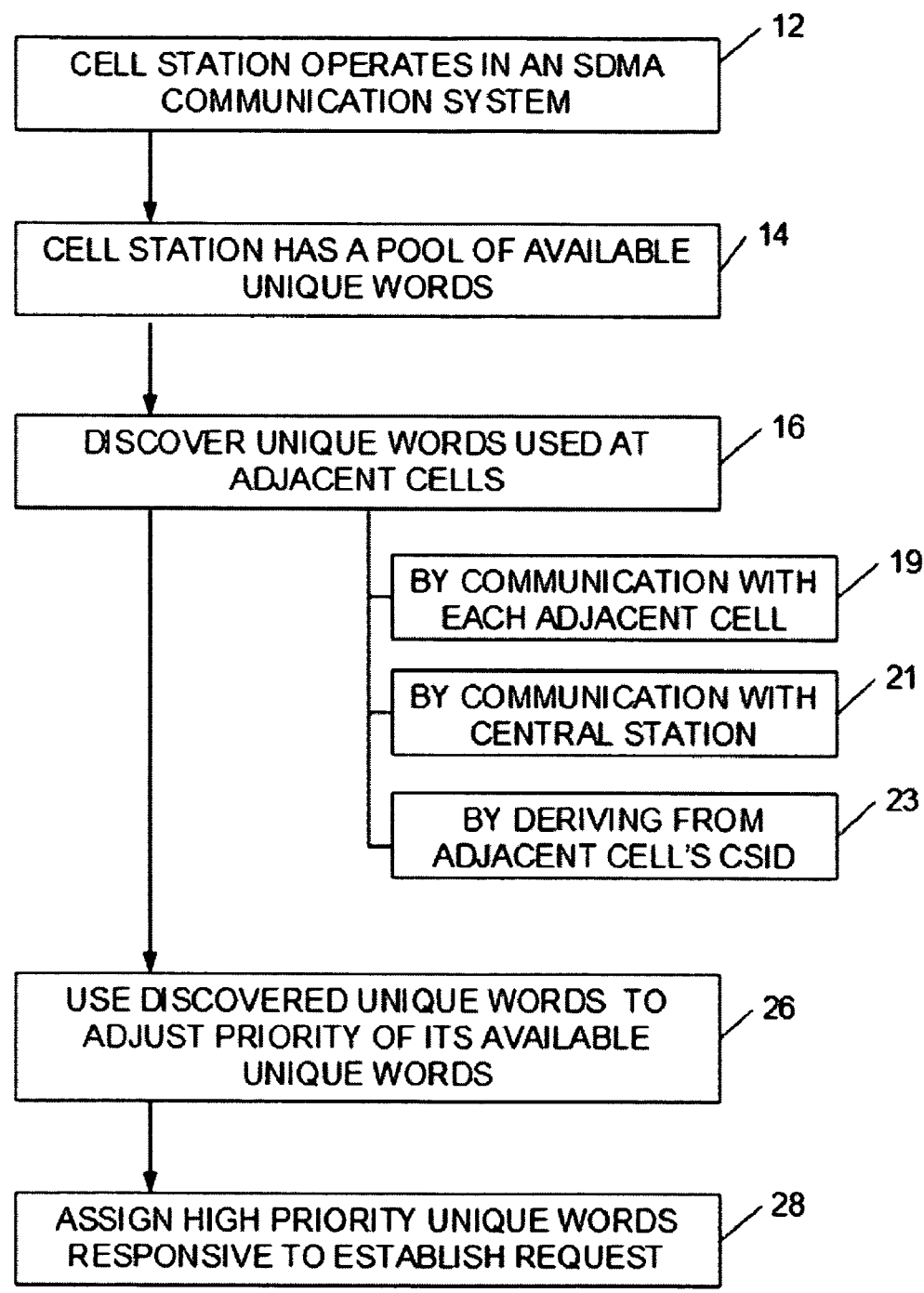
FIG. 1 is a flowchart of a method operating on a cell station for assigning a unique word in accordance with the present invention.

Referring now to FIG. 1, method 10 for operating a base station on a communication system is illustrated. Method 10 is illustrated as a method operating on a cell station within a PHS communication system as shown in block 12. However, it will be appreciated that other communication systems employing an SDMA (spatial division multiple access) system may be used. The general design and implementation of an SDMA communication system and base station is well-known, so will not be described in detail.

The PHS Communication system has a set of base stations for communicating with a number of remote mobile devices. Each base station has a local area in which it communicates, which is often referred to as a "cell". Cells may be arranged in a pattern so that adjacent cells somewhat overlap. In this way, as a mobile device moves from one cell to another, one base station may hand off the communication to the other base station in an orderly and controlled manner. This handoff process is often referred to as a soft handoff or handover.

Although method 10 is discussed with reference to operation on a single cell station, it will be understood that the method may be employed by several cell stations cooperating in a communication system.

Since the PHS communication system operates according to an SDMA process, the cell station assigns each personal station a unique word responsive to an establish request. These unique words are used for determining the spatial signature of personal stations during communication processes. This spatial signature assists the cell stations in directing their antenna array, as well as in differentiating the communication signal arriving from each personal station. At termination of the communication with the cell station, the unique word is released, and is available to be assigned for another communication session. The use and implementation of a unique word in an SDMA system is well-known, so will not be discussed in detail.

It will be appreciated that the number of unique words available for each cell station may vary according to the particular communication system in use. Typically, a communication system has a limited number of unique words available for use, so unique words are shared and reused across the communication system. In some cases, the number of unique words available for use in each cell station will be a fixed number, and the unique words will be pre-assigned during system configuration. To enable configuration flexibility, the number of unique words assigned to each cell station may exceed the number of unique words that the cell station will be permitted to assign. For example, each cell station may be assigned an available set of unique words as shown in block 14. This pool or set of available unique words may contain more unique words than the cell station may assign out at any one time. For example, the available pool may contain 10 unique words, while the cell station may be permitted to assign only three unique words at any one time. Thus, the cell station is allowed to prioritize or otherwise choose which three out of the ten unique words that will be in use at any one time. It will be appreciated that the number of unique words in the set, and the number of unique words assigned, may be adjusted according to the needs and configuration of the communication system.

In an SDMA communication system, overall communication performance may be improved when all mobile stations operating in a geographic area have very different unique words. That is, lower cross-correlation effects among near-by mobile stations enables the cell stations to more precisely and efficiently effect communication. For example, if two mobile station are in the same general area, but are communicating with different cell stations, it is desirable that their unique words have very low cross correlation. In operation, method 10 increases the difference level in the unique words assigned by adjacent cells, and thereby enables lower cross-correlation effects between near-by personal stations that are operating on different cell stations.

In order to effectuate these improved correlation effects, the cell station discovers which unique words are likely to be used in adjacent cells, as shown in block 16. By discovering which unique words are likely to be used in adjacent cells, the cell station may adjust the priority of its own pool of unique words, as shown in block 26. In this way, more desirable unique words with better inter-cell cross-correlation effects may be assigned, as shown in block 28. For example, the cell station may evaluate its set of unique words to determine which unique words are most likely to have the lowest cross correlation with unique words likely to be used in adjacent cells. By assigning unique words according to this priority, better communication quality and signal separation may be obtained. Also, since each cell adapts its prioritized list of unique words, changes may be made to the overall communication system, and each cell station will adapt to the change. This level of adaptability eases system management, and enables the overall communication system to continually make adjustments for improved performance.

There are several mechanisms by which the cell station may discover unique words likely to be used in adjacent cells. For example, block 19 shows that cells may be in direct network communication with each other. This network communication may be a system over-the-air communication, or may be through a data network connection, such as a satellite, microwave, or land-line connection. In one particular example of a network connection, the cells communicate through an wide area ethernet or Internet connection. It will be appreciated that cell-to-cell communication may be effectuated in a variety of ways. In the direct connection process of block 19, each cell may "broadcast" on the network which unique words it is currently using or will be likely to use. This communication may be done periodically, or whenever a cell station makes a change to its likely-to-use or in-use unique words. Also, the cell station should be able to identify if a broadcasting cell station is from an adjacent or near-by cell. This may accomplished by predefining cell arrangements, or, if more flexibility is required, by transmitting position location information along with the broadcast of unique words. In this latter example, a cell station would receive a list of unique words and position location of the cell station that is likely to use those words. Since the cell station is aware of its own location, it can determine if the received list of words comes from an adjacent or near-by cell. Also, in the case of an over-the-air system broadcast, a cell station is likely to only receive communications from nearby cells, so can readily identify adjacent cells.

The cell station may also discover unique words likely to be used in adjacent cells by communicating with a central station, as shown in block 21. Typically, communication from cell station to central station will be through a network connection, such as a satellite, microwave, or land-line connection. In one particular example of a network connection, the cells and central office communicate through an ethernet or Internet connection. It will be appreciated that cell-to-central communication may be effectuated in a variety of ways. Since the central station is in communication with several cell stations, it may communicate to each cell station the unique words that adjacent cells are using or likely to use.

Finally, the cell station may also discover unique words likely to be used in adjacent cells by deriving the list from the CSIDs of adjacent cells, as shown in block 23. In this approach, the unique words that each cell is allowed to use are calculated or otherwise derived from that cell stations CSID (cell station identification). The CSID of every cell station is unique, and therefore may act as the seed to an algorithmic process for defining a set of unique words. Although such an algorithm may be readily devised, it would be quite demanding to have the algorithm robustly generate sets of unique words that, in every combination, provide very low cross correlation effects. However, by using method 10, each base station's pool of available unique words may be prioritized to provide improved cross correlation effects. Cells may discover the CSID of adjacent cells in a variety of ways. For example, the cells may be directly connected, share information through a central office connection, or the CSIDs may be predefined during system configuration. In an alternative way, a cell station may extract CSID information from personal stations handing-off calls. In this arrangement, when a personal station makes an establish request, it includes CSID information for the cell with which it is currently communicating. Since the hand-off call is coming from an adjacent cell, the receiving cell is now aware of the adjacent cell's CSID.

Figure 2:
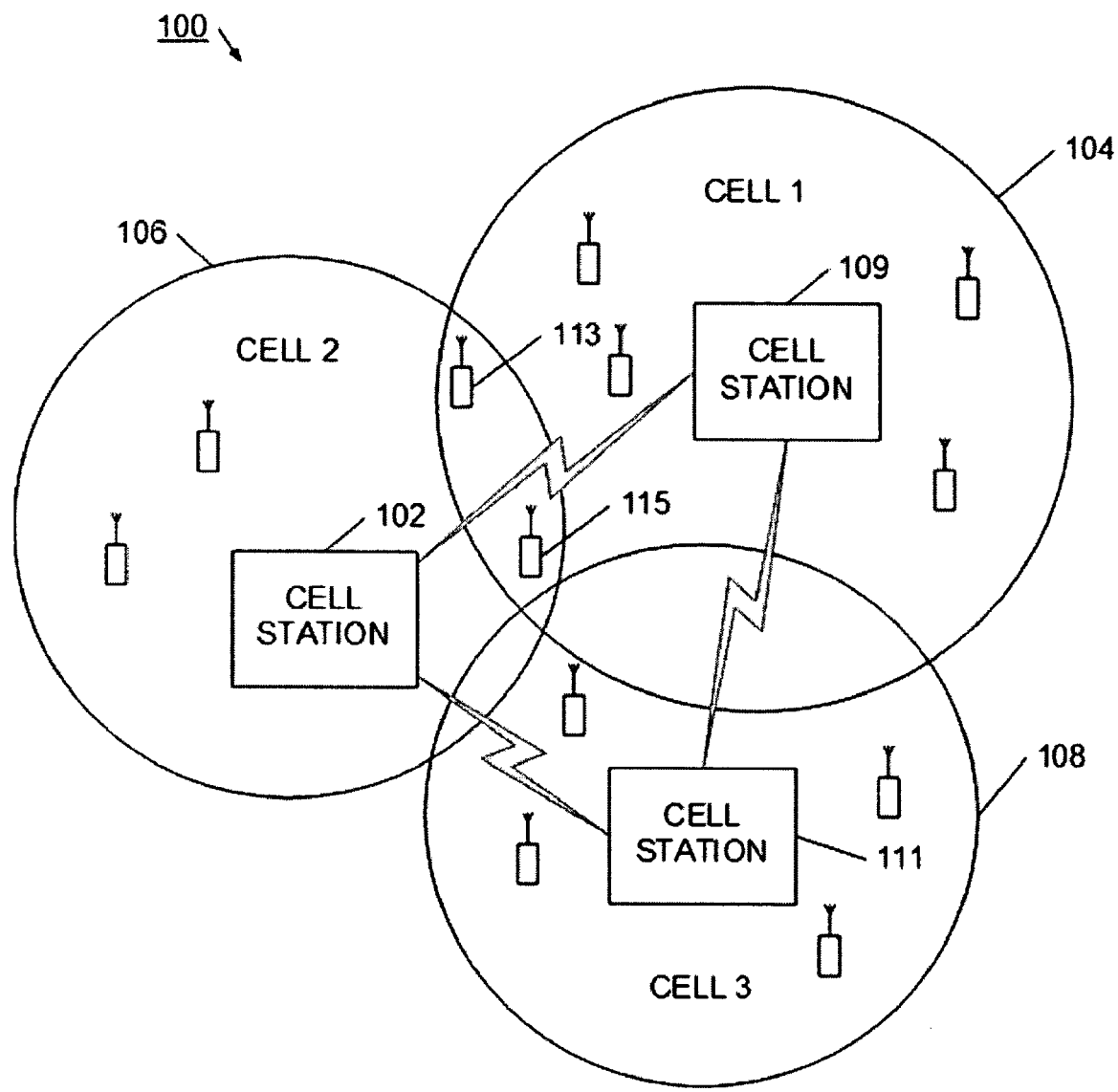
FIG. 2 is a diagram of an SDMA communication system in accordance with the present invention.

Referring now to FIG. 2, an SDMA system is illustrated. The SDMA system is shown as PHS communication system 100, although it will be appreciated that other types of SDMA communication systems may be used. PHS system 100 shows that each cell 102/109/111 is in communication with other cells. This communication may be a direct over-the-air communication using communication system resources, or may be through another communication path, such as a TCP/IP network connection. The communication may be peer-to-peer, mesh, star, or other topology consistent with the overall communication system design. The network connection may use, for example satellite, microwave, or land-line connection. In one particular example of a network connection, the cells communicate through an Ethernet or Internet connection, although it will be appreciated that cell-to-cell communication may be effectuated in a variety of ways.

The PHS system 100 has three overlapping cells 104/106/108 each having a respective cell station 102/109/111. Each cell 104/106/108 has a set of personal stations with its cell boundaries. Each cell communicates to the other cells the unique words it is actually using, or, in the alternative, the unique words in its list of available unique words. This communication may be done during system configuration, and then again each time a change is made to the unique words used by that cell station. In another example, the communication is more periodic or regular. By broadcasting its unique words, adjacent cell stations are made aware of the unique words in use or likely to be used by the broadcasting cell station. In this way, each cell is able to adjust the priority of its list of available unique words, and select words for assignment that have the best opportunity for low cross correlation with personal stations in adjacent cells.

As personal stations make establish requests, the cells will assign high priority unique words. These high priority unique words have been selected to have low cross correlation effects with personal stations operating with an adjacent cell. For example, personal station 113 may be communicating with cell station 102, and personal station 115 may be communicating with cells station 109. Even though they are in communication with different cell stations, personal station 113 is nearby personal station 115. Advantageously, cell station 102 is aware of the unique words that cell station 109 may assign, so has prioritized its list of available unique words accordingly. In a similar manner, cell station 109 is aware of the unique words that cell station 102 may assign, so has prioritized its list of available words accordingly. In this way, personal station 113 and personal station 115 are each assigned a unique word that has a low cross correlation with the other. Also, both cell station 102 and cell station 109 are aware of the unique words that cell station 111 may assign, so each has also prioritized its list accordingly. It will be appreciated that the list of available unique words may be prioritized according to an average or expected area-wide correlation effect, rather than on an individual correction basis. For example, even if a unique word has desirably low cross correlation effects with one adjacent cell, that word may be placed at a low priority if it has high cross correlation effects with words or signals from another adjacent cell. It will therefore be understood that the prioritization of the list of available unique words may accommodate tradeoffs, compromises, and system-level requirements.

In some cases, a cell station may need additional information to identify adjacent cells. For example, when a set of unique words is received from a remote cell station on an Internet connection, the list may not by itself indicate if the words are for an adjacent cell. Therefore, the list of unique words may also include the position location of the sending cell site, or another indicator of its relative position to the receiving cell station. Since a cell station knows its own position location, it may compare the location in the received message and determine if the unique words are from a near-by or adjacent cell. It will be appreciated that alternative processes and methods may be used to identify adjacent or nearby cells.

Figure 3:
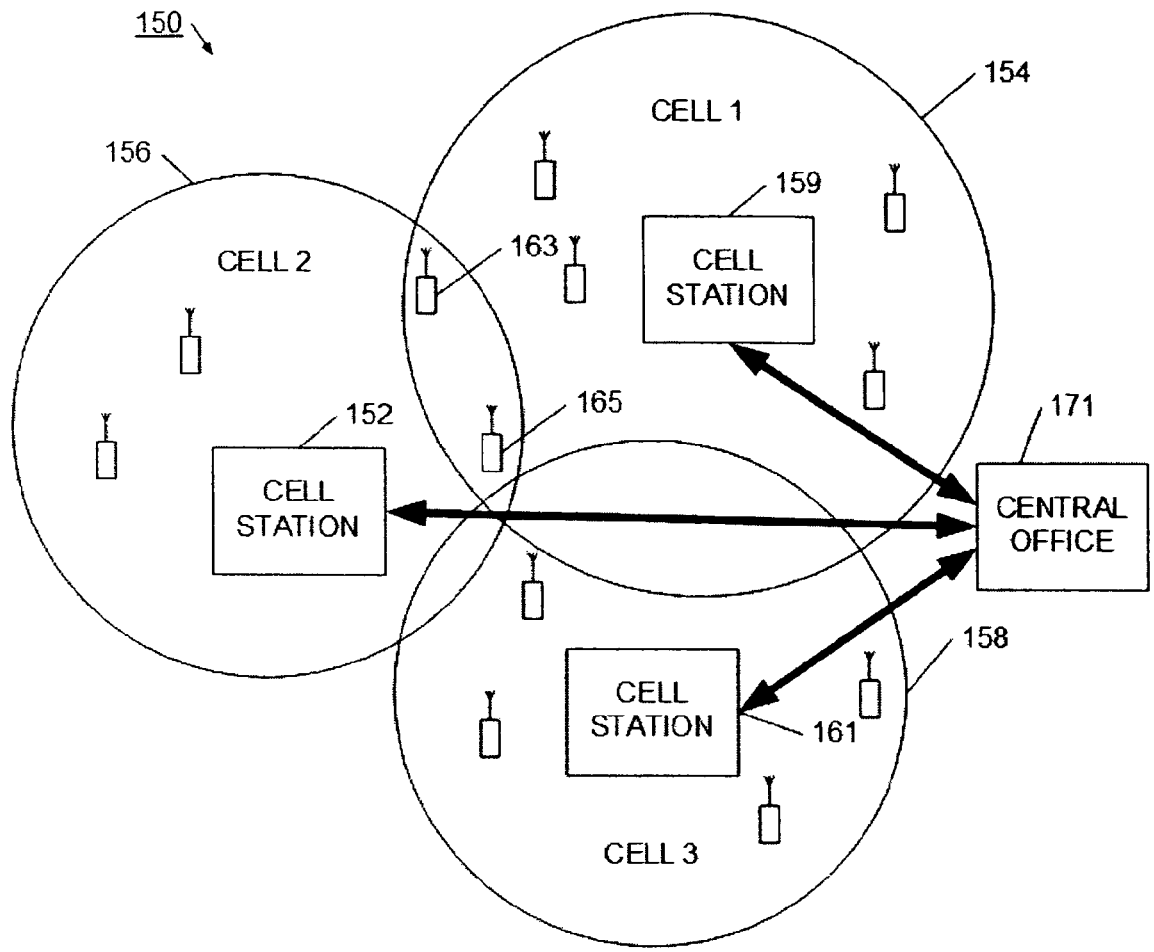
FIG. 3 is a diagram of an SDMA communication system in accordance with the present invention.

Referring now to FIG. 3, an SDMA system is illustrated. The SDMA system is shown as PHS communication system 150, although it will be appreciated that other types of SDMA communication systems may be used. PHS system 150 shows that each cell 102/109/111 is in communication with a central office 171. This communication may be a direct over-the-air communication using communication system resources, or more likely, may be through another communication path, such as a network connection. The network connection may use, for example satellite, microwave, or land-line connection. In one particular example of a network connection, the cells communicate through an ethernet or Internet connection, although it will be appreciated that cell-to-central communication may be effectuated in a variety of ways.

The PHS system 150 has three overlapping cells 152/159/161 each having a respective cell station 152/159/161. Each cell 152/159/161 has a set of personal stations with its cell boundaries. Each cell communicates to the central office the unique words it is actually using, or, in the alternative, the unique words in its list of available unique words. In another arrangement, the central office determines the set of available unique words for each cell station. Either way, the central station is thereby enabled to communication back to each cell station the unique words in use in its adjacent cells. This communication may be done during system configuration, and then again each time a change is made to the unique words used by a cell station. In another example, the communication is more periodic or regular. By broadcasting the sets of unique words, cell stations are made aware of the unique words in use or likely to be used by adjacent cells. In this way, each cell is able to adjust the priority of its list of available unique words, and select words for assignment that have the best opportunity for low cross correlation with personal stations in adjacent cells.

As personal stations make establish requests, the cells will assign high priority unique words. These high priority unique words have been selected to have low cross correlation effects with personal stations operating with an adjacent cell. For example, personal station 163 may be communicating with cell station 152, and personal station 165 may be communicating with cells station 159. Even though they are in communication with different cell stations, personal station 163 is nearby personal station 165. Advantageously, cell station 152 is aware of the unique words that cell station 159 may assign, so has prioritized its list of available unique words accordingly. In a similar manner, cell station 159 is aware of the unique words that cell station 152 may assign, so has prioritized its list of available words accordingly. In this way, personal station 163 and personal station 165 are each assigned a unique word that has a low cross correlation with the other. Also, both cell station 152 and cell station 159 are aware of the unique words that cell station 161 may assign, so each has also prioritized its list accordingly. It will be appreciated that the list of available unique words may be prioritized according to an average or expected area-wide correlation effect, rather than on an individual correction basis. For example, even if a unique word has desirably low cross correlation effects with one adjacent cell, that word may be placed at a low priority if it has high cross correlation effects with another adjacent cell. It will therefore be understood that the prioritization of the list of available unique words may accommodate tradeoffs, compromises, and system-level requirements.

Since the central station knows the position location of each cell station, it may communicate to each cell only the unique words from adjacent cells. It will be appreciated that alternative processes and methods may be used to identify adjacent or near-by cells.

Figure 4:
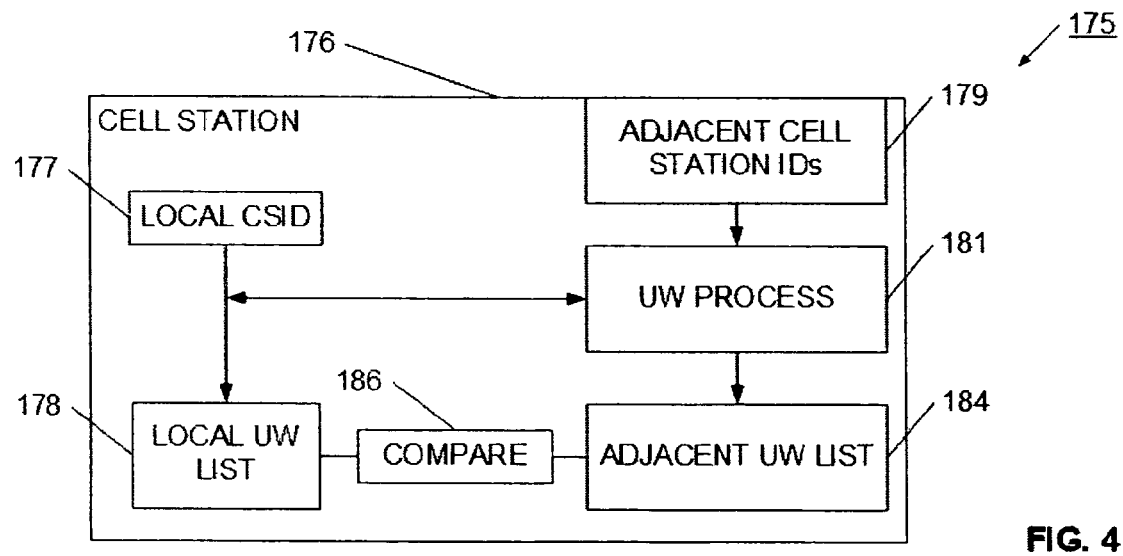
FIG. 4 is a diagram of a cell station for an SDMA communication system in accordance with the present invention.

Referring now to FIG. 4, cell station 175 is illustrated. Cell station 175 is for use in an SDMA communication system, such as a PHS communication system. Although only one cell station 175 is illustrated, it will be understood that the PHS communication system is likely to have many operating cell stations, with each cell station configured to communicate with many personal stations. Cell station 175 has a CSID 177 (central station identification), which is an exclusive value identifying the central station from all other central stations. The CSID is received into an UW process 181 where an algorithm is applied to generate a set of available unique words 178. For example, the local CSID may be used as a seed value to a algorithm, which can then generate a set of words responsive to the seed. In use, each central station operates the same UW process, so each cell station has a set of unique words that is different from the set in every other cell station.

The cell station 175 is also aware of the CSID values for each of its adjacent cells. Cells may discover the CSID of adjacent cells in a variety of ways. For example, the cells may be directly connected, share information through a central office connection, or the CSIDs may be predefined during system configuration. In an alternative way, a cell station may extract CSID information from personal stations handing-off calls. In this arrangement, when a personal station makes an establish request, it includes CSID information for the cell with which it is currently communicating. Since the hand-off call is coming from an adjacent cell, the receiving cell is now aware of the adjacent cell's CSID.

Irrespective of how the CSID is discovered, the cell station 175 uses UW process 181 to generate a list of unique words 184 that are the unique words all adjacent cells are likely to use. Adjacent list 184 is compared 186 to local list 178 to rank the words in local list 178 according to correlation effects. More particularly, unique words in local list 178 that have relatively low cross correlations with words in list 184 are assigned a higher priority. In a similar manner, unique words in local list 178 that have relatively high cross correlations with words in list 184 are assigned a lower priority. In this way, cell station 175 prioritizes local list 178 so for improved signal separation and system performance.

Figure 5:
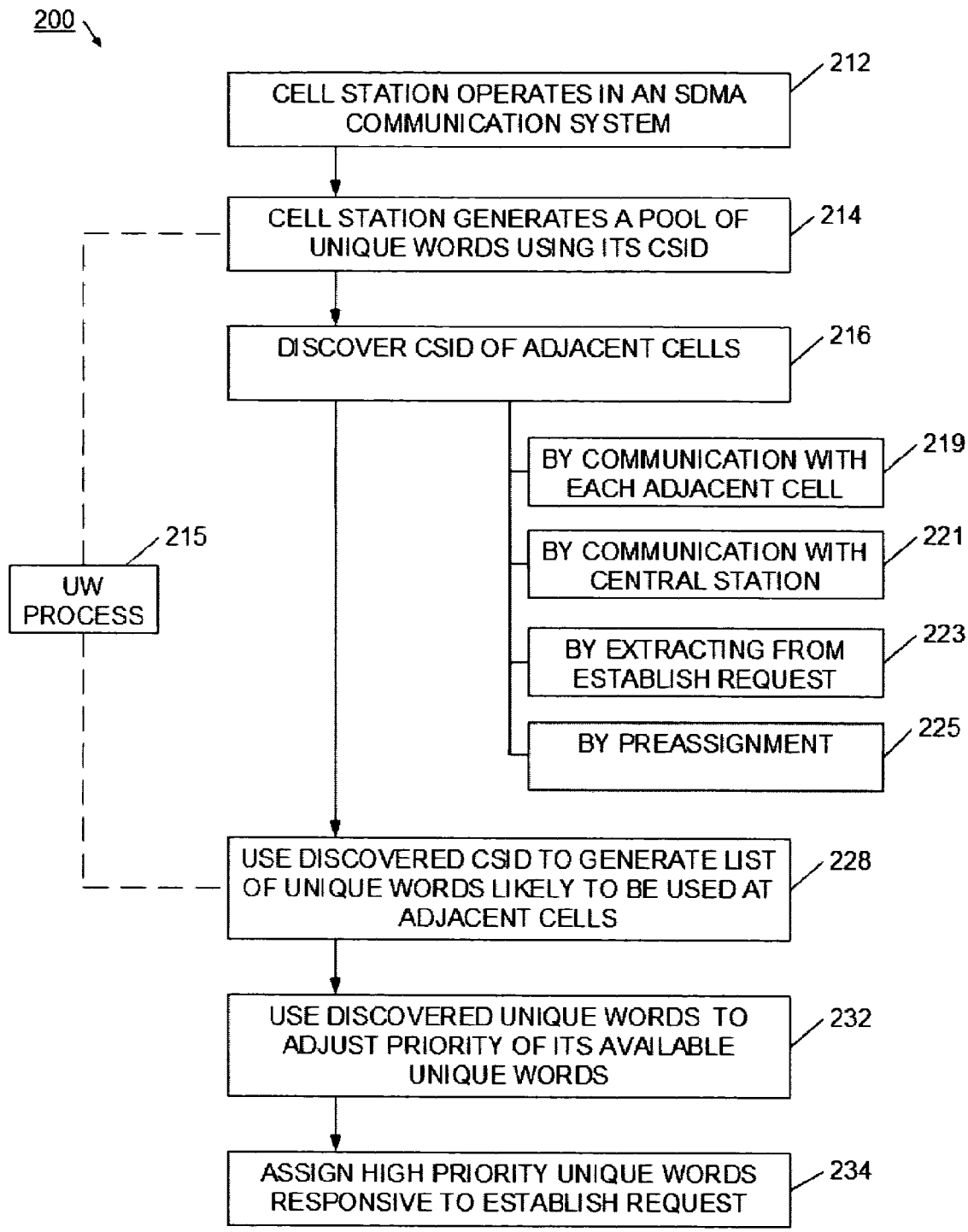
FIG. 5 is a flowchart of a method operating on a cell station for assigning a unique word in accordance with the present invention.

Referring now to FIG. 5, a method for discovering CSID values of adjacent cells is illustrated. Method 200 has a cell station operating an SDMA communication system, as shown in block 212. The SDMA communication system will be described with reference to a PHS communication system, although other SDMA communication systems may be used. The cell station generates a pool of available unique words using a UW process 215. For example, UW process 215 may be a randomization algorithm that uses the CSID as a seed value. In this way, process 215 may readily generate a set of unique words that is different from any other set that is generated using a different seed value. The design and implementation of a randomization or value generation process is well known, so will not be discussed in detail.

As shown in block 216, the cell station discovers the CSIDs for the cell stations in its adjacent or nearby cells. There are several mechanisms by which the cell station may discover the CSID of the cell station in adjacent cells. For example, block 219 shows that cells may be in direct communication with each other. This communication may be a system over-the-air communication, or may be through a network connection, such as a satellite, microwave, or land-line connection. In one particular example of a network connection, the cells communicate through an Ethernet or Internet connection. It will be appreciated that cell-to-cell communication may be effectuated in a variety of ways. In the direct connection process of block 219, each cell may "broadcast" its CSID. This communication may be done during initialization, and when new cell stations are added, or a cell station is updated. Also, the cell station should be able to identify if a broadcasting cell station is from an adjacent or near-by cell. This may accomplished by predefining cell arrangements, or, if more flexibility is required, by transmitting position information along with the broadcast of the CSID. In this latter example, a cell station would receive a CSID and position location of the transmitting cell station Since the cell station is aware of its own location, it can determine if the received CSID comes from an adjacent or near-by cell. Also, in the case of an over-the-air system broadcast, a cell station is likely to only receive communications from nearby cells, so can readily identify adjacent cells.

The cell station may also discover the CSID of adjacent cells by communicating with a central station, as shown in block 221. Typically, communication from cell station to central station will be through a network connection, such as a satellite, microwave, or land-line connection. In one particular example of a network connection, the cell stations and central office communicate through an ethernet or Internet connection. It will be appreciated that cell-to-central communication may be effectuated in a variety of ways. Since the central station is in communication with several cell stations, it may communicate to each cell station the CSIDs used by central stations in adjacent cells.

The cell station may also discover the CSID of adjacent cells by extracting CSID information from personal stations during a call hand-off as shown in block 223. In this arrangement, when a personal station makes an establish request, it includes CSID information for the cell with which it is currently communicating. Since the hand-off call is coming from an adjacent cell, the receiving cell is now aware of the adjacent cell's CSID. Over time, the cell station will receive handoff calls from all its adjacent cells, and thereby discover the CSIDs of the cell stations in adjacent cells. Finally, the cell station may also discover the CSID of adjacent cells by having the CSIDs of adjacent cell stations predefined or preprogrammed, as shown in block 225. Since CSIDs are relatively static, and cell stations are not very often added or removed from a communication system, each central station may simply have a list of the CSIDs of all adjacent cell stations. In this way, no dynamic discover of CSIDs is required. However, cell stations would need to be provided an updated adjacent CSID list as cell stations are moved, added, or removed.

As the cell station discovers the CSIDs of adjacent cell stations, the cell station uses the discovered CSIDs to generate a list of unique words likely to be used in the adjacent cells, as shown in block 228. In particular, the cell station applies the UW process 215 for each discovered CSID. Since the same UW process is used by all central stations, the central station is able to duplicate the unique words that each adjacent cell is likely to use. The central station is now able to use the generated set of adjacent unique words to adjust the priority of its own local list of available unique words, as shown in block 232. In particularly, unique words in the local pool are compared to the unique words in the list of words likely to be use in adjacent cells. Unique words in the local pool that have relatively low cross correlations with words in the adjacent list are assigned a higher priority. In a similar manner, unique words in the local pool that have relatively high cross correlations with words in the adjacent list are assigned a lower priority. As a result of prioritizing the local pool of available unique words, the cell station is able to assign high priority unique words to personal stations when an establish request is received, as shown in block 234.

Figure 6:
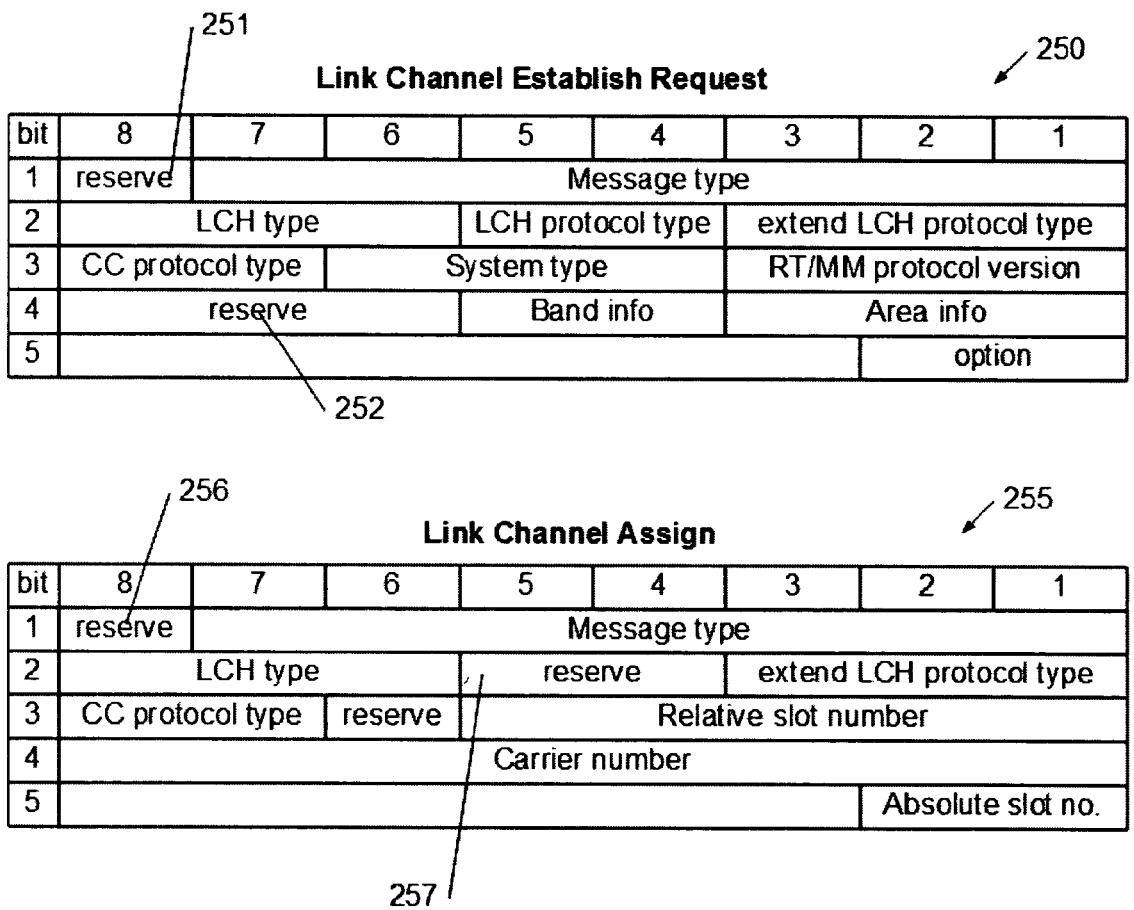
FIG. 6 is a diagram of message frames and messaging in a SDMA communication system in accordance with the present invention.

Referring now to FIG. 6, PHS link messages are illustrated. In one arrangement discussed above, a cell station may discover the CSID of the cell station in an adjacent cell by extracting the CSID from the link request of an arriving personal station. Message 250 shows a PHS link establish request message, and shows that frame areas 251 and 252 may be used to communicate the current CSID information from the personal station to the new central station. When the new central station receives the establish request from an arriving personal station, it may extract the CSID information, and thereby discover the CSID of the cell station in an adjacent cell. It will be appreciated that if the personal station is requesting a new call, rather than a hand-off, that the CSID information would not be transmitted. Message 255 shows a link channel assign message having reserve frame areas 256 and 257. In one use, these areas would allow a cell station to transmit additional information, such as CSID information to a personal station. Then, at a later time, the personal station may transmit the CSID information when requesting a call hand-off.

Figure 7:
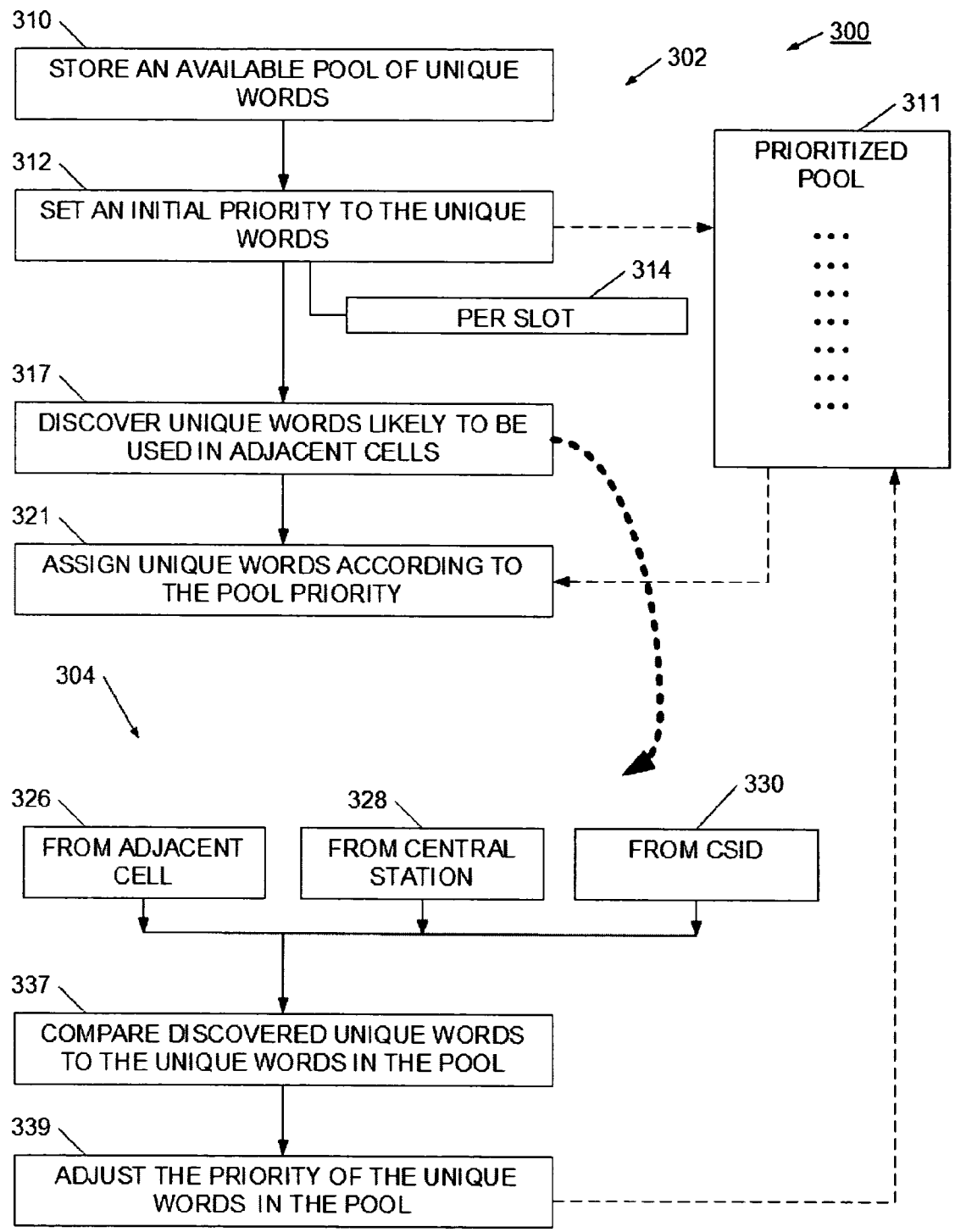
FIG. 7 is a flowchart of a method for prioritizing a list of available unique words for an SDMA communication system in accordance with the present invention.

Referring now to FIG. 7, a method of prioritizing unique words is illustrated. Method 300 has a cell station which stores an available pool of unique words as shown in block 310. The pool of unique words may be assigned an initial priority as shown in block 312. In one particular example, the priorities are set on a per timeslot basis as shown in block 314. However, it will be appreciated the priorities may be set according to other arrangements. The cell station then discovers the set of unique words that is likely to be used in adjacent cells, as shown in block 317. As establish requests are received from personal stations, the cell station then assigns unique words according to the pool priority as shown in block 321. As illustrated in method 300, cell station operates a use process 302 for assigning unique words from the prioritized pool 311, and has a prioritization process 304 for adjusting the priority within the prioritize pool 311. It will be understood that other processes may be used to adjust the priority of individual unique words, as well as process 304.

Process 304 may operate at initialization of the communication system, and responsive to new system configurations. In other uses, process 304 may operate periodically, or on a regular basis. It will be understood that the prioritization processes may be performed at different times and responsive to different events depending on system or cell station requirements. Process 304 may discover adjacent unique words in different ways. For example, adjacent unique words may be directly discovered by communications with adjacent cells as shown in block 326, or by communication with a central office as shown in block 328. In another example, the list of unique words used in adjacent cells may be calculated or derived, for example, by applying an algorithmic process to the adjacent cell stations' CSIDs. The discovered unique words may then be used to adjust the priority of the unique words in local pool 311. For example, unique words in pool 311 that have a higher cross correlation with the extracted unique words will be set to a lower priority. In a similar manner, words having a more desirable low cross correlation effect will be moved up in priority. Accordingly, over time, prioritized pool 311 identifies unique words likely to interfere with words used in adjacent cells, and sets those unique words to a low priority. In this way, higher priority unique words assigned by the cell station are more likely to have desirably low cross correlation characteristics, as well as improve overall communication sensitivity.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

What is claimed is:

1. A method for assigning at least a unique word from a cell station that is operating an SDMA (Spatial Division Multiple Access) communication process, the method comprising:
    receiving broadcasted unique words that are broadcasted by a plurality of other cell stations, the broadcasted unique words being likely to be used by the plurality of other cell stations;
    identifying, among the plurality of other cell stations, cell stations in adjacent cells that are adjacent to a cell associated with the cell station;
    discovering a set of likely-used unique words that are likely to be used by the cell stations in the adjacent cells, the set of likely-used unique words being a subset of the broadcasted unique words, where the discovering comprises receiving at least some of the likely-used unique words in a message, wherein the message includes information indicating the message is from a cell station in an adjacent cell;
    comparing the discovered set of likely-used unique words to a set of available unique words, where the comparing includes determining a level of cross correlation between each unique word in the set of discovered likely-used unique words and each unique words in the set of available unique words;
    adjusting, responsive to the comparison, priority of unique words in the set of available unique words, where the adjusting includes setting unique words with lower cross correlation effects to a higher priority;
    selecting a high priority unique word from the set of available unique words;
    generating an assignment message including the high priority unique word; and
    assigning, according to the adjusted priority, unique words from the set of available unique words to multiple mobile devices.

2. The method according to claim 1, wherein the message is received via an over-the-air connection, network connection, Internet connection, or satellite connection.

3. The method according to claim 1, further including the steps of:
    generating a message indicative of the set of available unique words;
    addressing the message to another cell station; and
    transmitting the message.

4. The method according to claim 1, wherein the discovering step further comprises receiving at least some of the likely-used unique words in a message, wherein the message has information indicating the message is from a central office.

5. The method according to claim 4, wherein the message is received via a network connection, Internet connection, or satellite connection.

6. The method according to claim 1, further including the steps of:
    generating a message indicative of the set of available unique words;
    addressing the message to a central office; and
    transmitting the message.

7. The method according to claim 1, further comprising locally generating in the cell station the set of available unique words using a unique identifying value for the cell station as a seed to an algorithmic process.

8. The method according to claim 7, wherein the unique identifying value is a CSID or location value for the cell station.

9. The method according to claim 1, wherein the comparing step further comprises locally generating at least some of the available unique words using a location value of an adjacent cell station.

10. The method according to claim 1, wherein the discovering step further comprises locally generating in the cell station at least some of the likely-used unique words using a CSID value of an adjacent cell station.

11. The method according to claim 10, further comprising receiving the CSID value in a message, wherein the message has information indicating the message is from a cell station in an adjacent cell.

12. The method according to claim 10, further comprising receiving the CSID value in a message, wherein the message has information indicating the message is from a central office.

13. The method according to claim 10, further comprising receiving the CSID value in a message, wherein the message is an establish request message from an arriving personal station.

14. The method according to claim 10, further comprising predefining a set of CSID values, the CSID values indicative of CSID values in cell stations in adjacent cells.

15. A method for prioritizing unique words in a cell station, the method comprising:
    storing a set of available unique words for the cell station;
    receiving broadcasted unique words that are broadcasted by cell stations in adjacent cells, the broadcasted unique words being likely to be used by the cell stations in adjacent cells;
    discovering cell station identifications of the cell stations in adjacent cells, the adjacent cells being adjacent to a cell associated with the cell station;
    locally generating in the cell station, using the discovered cell station identifications of the cell stations in the adjacent cells, a set of likely-used unique words that are likely to be used by the cell stations in the adjacent cells, the set of likely-used unique words being a subset of the broadcasted unique words;
    comparing the generated set of likely-used unique words to the set of available unique words, where the comparing includes determining a level of cross correlation between each unique word in the set of generated likely-used unique words and each unique words in the set of available unique words; and
    prioritizing unique words in the set of available unique words according to correlation with unique words in the set of likely-used unique words, wherein the prioritizing step includes at least one of:
        identifying a unique word in the set of available unique words that has low cross correlation effects with words in the set of likely-used unique words, and setting that unique word to have a high priority, identifying a unique word in the set of available unique words that has low cross correlation effects with every word in the set of likely-used unique words, and setting that unique word to have a high priority, identifying a unique words in the set of available unique words that has high cross correlation effects with words in the set of likely-used unique words, and setting that unique word to have a low priority, and identifying a unique words in the set of available unique words that has high cross correlation effects with every word in the set of likely-used unique words, and setting that unique word to have a low priority.

16. The method according to claim 15, wherein the number of unique words in the set of available unique words is more than the number of unique words that are permitted to be assigned.

17. The method according to claim 15, wherein the set of available unique words is organized according to time slot number.

18. The method according to claim 17, wherein unique word priority is set independently for each time slot number.

19. The method according to claim 16, wherein the request message is received as a PHS establish request message.

20. A method for prioritizing unique words in a cell station, the method comprising:

storing a set of available unique words for the cell station;

receiving broadcasted unique words that are broadcasted by cell stations in adjacent cells, the broadcasted unique words being likely to be used by the cell stations in adjacent cells;

discovering cell station identifications of the cell stations in adjacent cells, the adjacent cells being adjacent to a cell associated with the cell station;

locally generating in the cell station, using the discovered cell station identifications of the cell stations in the adjacent cells, a set of likely-used unique words that are likely to be used by the cell stations in the adjacent cells, the set of likely-used unique words being a subset of the broadcasted unique words;

comparing the generated set of likely-used unique words to the set of available unique words, where the comparing includes determining a level of cross correlation between each unique word in the set of generated likely-used unique words and each unique words in the set of available unique words; and prioritizing unique words in the set of available unique words according to correlation with unique words in the set of likely-used unique words wherein the prioritizing step includes identifying a unique word in the set of available unique words that has low cross correlation effects with words in the set of likely-used unique words, and setting that unique word to have a high priority.

21. A method for prioritizing unique words in a cell station, the method comprising:

storing a set of available unique words for the cell station;

receiving broadcasted unique words that are broadcasted by cell stations in adjacent cells, the broadcasted unique words being likely to be used by the cell stations in adjacent cells;

discovering cell station identifications of the cell stations in adjacent cells, the adjacent cells being adjacent to a cell associated with the cell station;

locally generating in the cell station, using the discovered cell station identifications of the cell stations in the adjacent cells, a set of likely-used unique words that are likely to be used by the cell stations in the adjacent cells, the set of likely-used unique words being a subset of the broadcasted unique words;

comparing the generated set of likely-used unique words to the set of available unique words, where the comparing includes determining a level of cross correlation between each unique word in the set of generated likely-used unique words and each unique words in the set of available unique words; and prioritizing unique words in the set of available unique words according to correlation with unique words in the set of likely-used unique words wherein the prioritizing step includes identifying a unique word in the set of available unique words that has low cross correlation effects with every word in the set of likely-used unique words, and setting that unique word to have a high priority.

22. A method for prioritizing unique words in a cell station, the method comprising:

storing a set of available unique words for the cell station;

receiving broadcasted unique words that are broadcasted by cell stations in adjacent cells, the broadcasted unique words being likely to be used by the cell stations in adjacent cells;

discovering cell station identifications of the cell stations in adjacent cells, the adjacent cells being adjacent to a cell associated with the cell station;

locally generating in the cell station, using the discovered cell station identifications of the cell stations in the adjacent cells, a set of likely-used unique words that are likely to be used by the cell stations in the adjacent cells, the set of likely-used unique words being a subset of the broadcasted unique words;

comparing the generated set of likely-used unique words to the set of available unique words, where the comparing includes determining a level of cross correlation between each unique word in the set of generated likely-used unique words and each unique words in the set of available unique words; and prioritizing unique words in the set of available unique words according to correlation with unique words in the set of likely-used unique words wherein the prioritizing step includes identifying a unique words in the set of available unique words that has high cross correlation effects with words in the set of likely-used unique words, and setting that unique word to have a low priority.

23. A method for prioritizing unique words in a cell station, the method comprising:

storing a set of available unique words for the cell station;

receiving broadcasted unique words that are broadcasted by cell stations in adjacent cells, the broadcasted unique words being likely to be used by the cell stations in adjacent cells;

discovering cell station identifications of the cell stations in adjacent cells, the adjacent cells being adjacent to a cell associated with the cell station;

locally generating in the cell station, using the discovered cell station identifications of the cell stations in the adjacent cells, a set of likely-used unique words that are likely to be used by the cell stations in the adjacent cells, the set of likely-used unique words being a subset of the broadcasted unique words;

comparing the generated set of likely-used unique words to the set of available unique words, where the comparing includes determining a level of cross correlation between each unique word in the set of generated likely-used unique words and each unique words in the set of available unique words; and prioritizing unique words in the set of available unique words according to correlation with unique words in the set of likely-used unique words wherein the prioritizing step includes identifying a unique words in the set of available unique words that has high cross correlation effects with every word in the set of likely-used unique words, and setting that unique word to have a low priority.

* * * * *